(12) United States Patent
Beck et al.

(10) Patent No.: US 6,658,863 B2
(45) Date of Patent: Dec. 9, 2003

(54) AIRBORNE GAS STORAGE AND SUPPLY SYSTEM

(75) Inventors: Philip Beck, Conifer, CO (US); Bernard Kutter, Golden, CO (US); Frank Zegler, Idledale, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/153,436

(22) Filed: May 21, 2002

(65) Prior Publication Data

US 2003/0005708 A1 Jan. 9, 2003

Related U.S. Application Data

(60) Provisional application No. 60/292,714, filed on May 22, 2001.

(51) Int. Cl.[7] .................................................. F17C 9/02
(52) U.S. Cl. ...................................................... 62/48.1
(58) Field of Search ........................... 62/48.1, 7, 50.2

(56) References Cited

U.S. PATENT DOCUMENTS

| | | | | |
|---|---|---|---|---|
| 1,953,533 A | * | 4/1934 | Edwards | 62/50.2 |
| 2,359,219 A | * | 9/1944 | Jones | 62/7 |
| 3,410,092 A | * | 11/1968 | Goldstein | 62/7 |
| 3,473,343 A | * | 10/1969 | Chamberlain | 62/7 |
| 4,292,062 A | * | 9/1981 | Dinulescu et al. | 62/7 |
| 4,608,831 A | * | 9/1986 | Gustafson | 62/48.1 |
| 5,722,232 A | | 3/1998 | Jones | 60/259 |
| 6,226,980 B1 | | 5/2001 | Katorgin et al. | 60/258 |

* cited by examiner

Primary Examiner—Timothy L. Maust
Assistant Examiner—Malik N. Drake
(74) Attorney, Agent, or Firm—Marsh Fischmann & Breyfogle LLP

(57) ABSTRACT

A system and method provide for storage and supply of a pressurized gas aboard a launch vehicle such as a rocket-powered craft. Certain rocket powered vehicles, require that one or more propellant tanks be pressurized for a continuous supply of propellant to the rocket engines and to maintain tank structural integrity. According to the system described herein, certain heating elements may be employed for controlling the pressure in a gas supply bottle during the outflow of gas from the bottle so as to provide a continuous supply of pressurized gas and to make available of a large percentage of the gas stored in the bottle. Further, the system described herein provides for the storage of helium under densities above that of liquid helium and through use of a heat source, such as rocket engine supplied hot gas, provides a supply of gas such that it can be used for tank pressurization. The system utilizes unusual properties of helium under extremely low temperature and high pressure conditions to disperse the requisite heat within the bottle using only free convective effects.

40 Claims, 9 Drawing Sheets

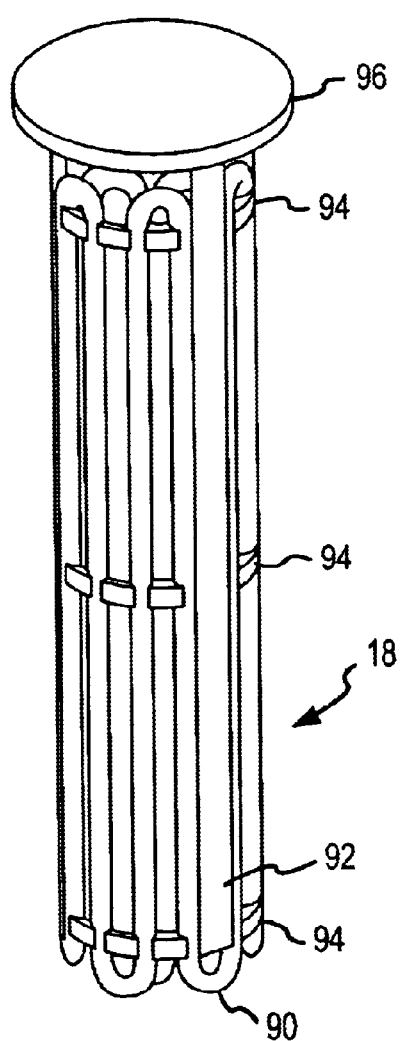
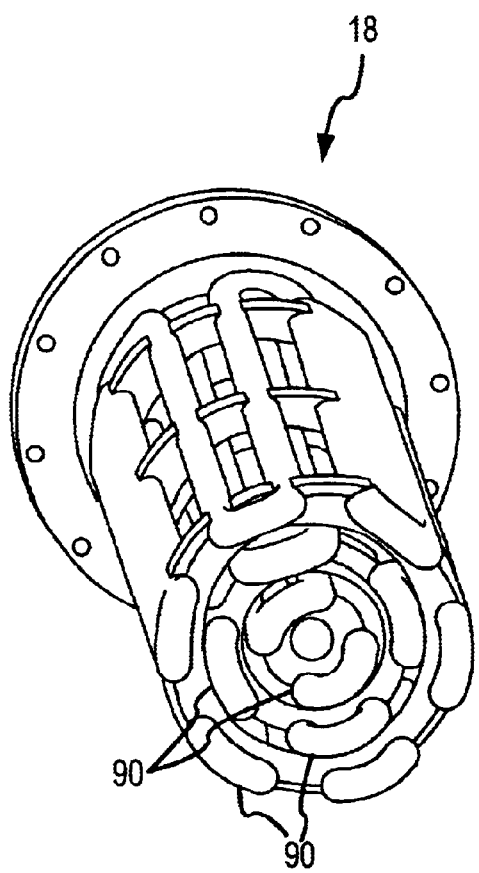
FIG.5a
FIG.5b

AIRBORNE GAS STORAGE AND SUPPLY SYSTEM

CROSS REFERENCE TO RELATED APPLICATIONS

This application claims priority from U.S. Provisional Application Ser. No. 60/292,714, that was filed on May 22, 2001, that is titled "Airborne Helium Storage and Supply System," and the entire disclosure of which is incorporated by reference in its entirety herein.

FIELD OF THE INVENTION

The invention described herein relates to an airborne gas storage system and method, and more specifically to a system and method for storing a greater amount of a pressurized gas on board a launch vehicle, and providing access to a greater portion of said gas.

BACKGROUND OF THE INVENTION

Various launch vehicles, such as rocket powered vehicles, will at times have a need for a source of pressurized gas. For example, liquid propellant rocket engines typically have one or more tanks on board which store propellant for the rocket engine. Propellant tanks such as those which store liquid oxygen (LOX) or kerosene, typically require tank pressurization in order to expel propellant at a controlled rate to the rocket engines or to maintain tank structural integrity. Certain gases are typically employed for this application because they do not condense at propellant temperatures. A gas which is regularly employed for this purpose is helium.

In a typical use of helium for this purpose, prior to lift off of a launch vehicle which employs liquid propellant, ground support equipment (GSE) will load pressurized gaseous helium (GHE) into flight storage bottles at ambient temperatures. The pressure at which the GHE is stored in the flight bottle provides for the flow of GHE from the flight bottle to the propellant tanks. In a typical application, many containers may be necessarily employed to provide the desired amount of helium gas.

SUMMARY OF THE INVENTION

The inventors have recognized that it would be desirable to employ a pressurized gas supply system which is configured to hold a large amount of pressurized gas and then provide access to substantially all of the gas so as to reduce the amount of residual gas remaining in the bottle. The inventors have further recognized that such a system is desirable if it is configured to use systems and components already present on the particular airborne craft, and significant modifications do not have to be made to the current system in order to employ the system described herein.

Described herein is a system and method for providing a source of pressurized gas. The system may include a bottle which is configured with sufficient structural integrity to receive and hold a stored gas where the bottle includes at least one valve device for controlling the inflow and outflow of the stored gas. Locatable within the bottle is at least one heating device configured so as to provide heat transfer from the device to the gas contained within the bottle so as to affect the gas pressure. The system may further include a supply line connectable to the first valve device which provides for directing the flow of the gas to a remote location.

In one configuration of the invention, the system described herein may be locatable aboard a rocket powered launch vehicle which employs a source of pressurized gas for purposes of pressurizing a propellant tank. For example, in liquid fuel rockets, an inert gas such as helium may be employed to pressurize the propellant tanks to provide constant propellant flow and to maintain tank structural integrity during flight. The system described herein is configured to control the pressure of the helium within the storage bottle and provide for the flow of the pressurized helium gas to the propellant tanks.

When helium or other inert gases are stored, the bottle may be configured to receive and store the gas in an extremely cold, high density, supercritical state. The supercritical helium is storable in the bottle at a high pressure. In one configuration of the invention, the heating device performs the task of heating the supercritical helium in the bottle to provide a desired pressure within the bottle. Pressurized gas may then exit the bottle and be directed to a remote source such as a propellant tank.

In yet another configuration of the invention, the heating device may comprise a heat exchanger through which a medium may pass which transfers its heat to the contents of the bottle. One medium may be the helium gas itself which is routed from the bottle to a remote heat exchanger, heated, and then returned to a heat exchanger in the bottle. The remote heat exchanger may employ hot gas from the propulsion system of the launch vehicle as a heat source. Other self-contained heaters, such as an electric heater, may also be employed for this purpose.

When the heated helium gas is passed through the heat exchanger in the bottle it transfers heat to the contents of the bottle. This transfer of heat from the medium to the stored content has the advantage that the medium is now cooled to the point that it is not hot enough to damage down stream components in the system. The medium exiting the bottle heat exchanger may then be routed through an external supply line to its ultimate destination, which may be a propellant tank.

In the configuration of the invention where the system is configured to store and provide access to a high density, supercritical gas such as helium, the bottle apparatus employed for this purpose may include an inner container portion (pressure vessel) which is constructed of a material of sufficient strength and ductility to provide for the storage of the gas at extremely low temperatures. In yet another configuration of the invention, the pressure vessel portion may be constructed of annealed Extra Low Interstitials (ELI) grade TI-6Al-4V (titanium alloy), because this singular grade has a very low specific heat and thermal conductivity, very high strength, adequate ductility and low density. The bottle may be further configured with at least one valve device for controlling the flow of helium gas in and out of the bottle.

Disposed around the pressure vessel portion may be at least one temperature control layer. This temperature control layer may be composed of multiple elements but whose principle purpose is to reduce the flow of heat from the external environment to the contents of the pressure vessel and to remove heat from the pressure vessel itself. In one configuration the pressure vessel is surrounded by a shroud which creates an annulus through which coolant flows. Liquid helium may be used as the coolant to cool and maintain the pressure vessel and the contents of the pressure vessel within the desired temperature band by intercepting heat coming from the environment and removing heat from the pressure vessel itself. The external surface of the shroud may be covered with a foam or ceramic fiber batting insulation material to minimize the amount of coolant required.

In yet another configuration the temperature control layer is composed of a vapor cooled shield. The vapor cooled shield is formed by placing a layer of insulation in direct contact with the pressure vessel exterior wall, next layering a thermally conductive metallic foil, and finally placing tubing which contains coolant in contact with the metallic foil layer. The coolant may be supplied from the contents of the pressure vessel or from an independent source and the flow controlled by one or more valves. These layers are then covered by insulative foam or ceramic batting. In this configuration, the pressure vessel is cooled by its contents boiling off, where boiled off gasses leave the tank through an orifice.

As was described above, the bottle may enclose a heating device for heating the contents of the bottle and thus controlling the internal temperature and pressure. In yet another configuration of the invention, the bottle heat exchanger may comprise an inlet manifold configured to receive the heated medium from the remotely located heat exchanger. Extending from the inlet manifold may be at least one tubular shaped member extending substantially through the inner volume of the container element. In connection with the tubular member may be a turnaround manifold which is further connected to another tubular member which extends through the inner volume of the container element in a direction substantially opposite to the first tubular member. This tubular member is further in connection with an exit manifold which provides for directing the pressurized gas which has been substantially cooled by fluid within the pressure vessel, to a supply line outside the container element.

In yet another configuration of the invention, the pressure vessel is configured with a polar aperture configured so as to enable the installation and removal of the heat exchanger. The aperture may be further sized so as to enable the welding of the pressure vessel subcomponent from the inside of the container so as to provide for a high quality weld with minimal defects. The aperture may further provide for the insertion of inspection tools, radiographic film and other devices which facilitate the inspection of any weld performed in the manufacture of the pressure vessel. In yet another configuration of the invention, the bottle is supported at the base by a flex support plate which provides a tailored flexibility and is high temperature resistant. The flex plate can provide an interface for the influx of coolant to the temperature control layer and also provide a gas tight seal to the element of the temperature control layer. The flex plate further provides a tortuous path for heat to flow from the environment to the inter container, and also provide passages for cooling to substantially remove the heat that does leak in before it reaches the pressure vessel. The flex plate may be fabricated from aged Inconel 718 which has high strength, high modulus and relatively low thermal conductivity as well as machinability and weldability.

In operation, the bottle assembly described above is first positioned aboard the launch vehicle or within the environment in which it is to operate. Depending on the type of gas employed and the condition in which it will be pumped into the bottle, certain preparations are made for the bottle to receive the gas. Once the desired amount of gas is pumped into the bottle and the bottle temperature and contents temperature and pressure are at desired levels, a valve device employable for controlling the outflow of gas may be manipulated to control the amount of pressurized gas which exits.

As the bottle empties, a heating device locatable within the bottle may be activated and employed so as to transfer a desired amount of heat to the remaining gas in the bottle. This transfer of heat has the effect that the bottle pressure is increased relative to a bottle without such a heat transfer thus providing a continuous supply of gas within a desired pressure range over a greater period of time. This heat also provides for the ability to use all or substantially all of the gas loaded in the tank. The amount of heat transferred to the bottle contents is controlled to adjust the exit temperature from the bottle heat exchanger so as to maximize the total amount of energy transferred to the propellant tanks so as to minimize the total amount of helium required without causing overheating of the downstream components or propellant tank. The design of the heat exchanger maximizes the free convection between the heat exchanger and the bottle contents so as to minimize the total heat transfer area required. External acceleration caused by the flight of the rocket vehicle also serves to enhance the heat transfer since the acceleration positively affects convection within the bottle. In the configuration of the invention where the stored gas is high density, supercritical helium, the gas may be initially stored at a temperature of approximately 20 degrees R and approximately 4600 PSI. If a self-contained heater positioned within the tank is employed, this heater along with the valve which controls the outflow gas are manipulated to provide a pressurized gas at a controlled rate.

In the configuration of the invention where an external heat exchanger is employed, the bottle contents (cold helium) is first routed via a supply line to the external heat exchanger where it picks up heat rejected from the rocket engine or some other source. The now hot helium may then be passed through the heat exchanger contained within the bottle where it gives up some of the heat acquired in the external heat exchanger to the gas in the bottle and then exits in a condition still hot enough to effectively pressurize a tank such as those employed as propellant tanks aboard launch vehicles employing rocket motors.

Prior to employing the bottle assembly for providing a source of pressurized gas, a particular procedure for loading the gas may need to be followed, especially in the case where supercritical helium is the stored gas. In the situation where the pressurized gas is employed to pressurize a propellant tank, prior to launch of the vehicle, the bottle assembly may be connected to ground support equipment. Initial chilldown of the bottle assembly is accomplished by flowing LHe coolant through the GSE, pressure vessel and temperature control layer and out through vents. Coolant flow is continued until the pressure vessel is substantially at liquid helium temperature and is substantially full with liquid helium. Flow through the pressure vessel and temperature control layer may be independently controlled using the GSE. Once the bottle and system are chilled and the bottle is substantially filled with LHE the pressure within the pressure vessel is raised using a liquid helium pump in the GSE until the desired operating pressure is achieved. Coolant flow through the temperature control layer continues at a low pressure throughout this process to continue to remove heat flowing towards the pressure vessel from the environment and also to remove the heat of compression from the fluid within the pressure vessel. Coolant flow may be adjusted to achieve the desired temperature and pressure conditions within the bottle with a minimum amount of coolant.

BRIEF DESCRIPTION OF THE DRAWINGS

FIGS. 5a and 5b disclose an alternative configuration of the heat exchanger locatable within the gas storage tank.

DETAILED DESCRIPTION

Described herein is a system and method for gas storage, wherein the system is configured to provide large amounts of pressurized gas in situations with high peak demand with minimal system complexity and minimum practical cost and weight while operating in a harsh vibration and acceleration environment. The system described herein further provides for storage of a maximum amount of gas with accessibility to substantially all of the stored gas with a minimum of residual gas left in the tank.

Figure 1:
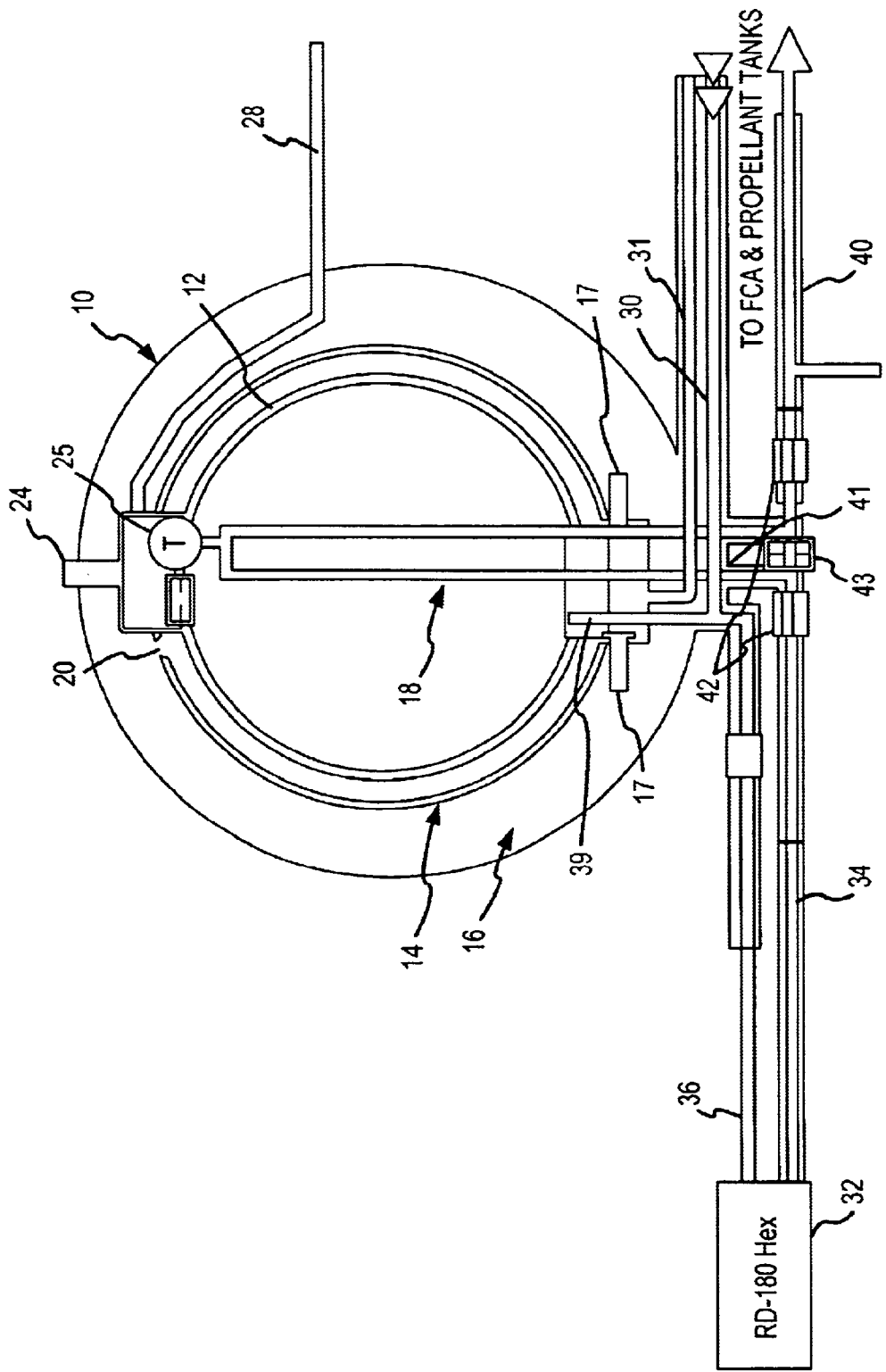
FIG. 1 discloses a system diagram for a gas storage system aboard a rocket-powered launch vehicle.

Disclosed in FIG. 1 is one configuration of the gas storage system as well as the environment within which it may operate. In the configuration shown in FIG. 1, the gas storage system is specifically configured to store high pressure, extremely cold, extremely dense, supercritical helium. Although helium is used in the configurations of the invention described herein, other liquids and gasses are storable in this manner. One use for storing helium in this manner is to provide airborne tank pressurization aboard a launch vehicle such as a liquid fueled rocket. In a situation where liquid oxygen (LOX) or kerosene are employed as propellants in a rocket motor, helium gas may be employed to pressurize the propellant tanks in order to provide a controlled flow of propellants to the rocket engines and to maintain propellant tank structural integrity.

In the system described herein, the gas is storable in a bottle assembly 10. The bottle assembly 10 may comprise an inner container (pressure vessel) 12, configured to hold the gas and constructed with the structural integrity to store the high-pressure gas in the particular environment. Also included as part of the bottle assembly 10 is a temperature control layer 16. The composition of the tank and temperature control layers will be described in greater detail below.

Incorporated as part of the temperature control layer 16 may be a shroud 14 or vapor cooled shield (VCS). The shroud 14 may be configured such that coolant gases from either the pressure vessel or an independent supply may be circulated and vented in order to provide cooling and insulative effects for the bottle assembly. The gas from within the pressure vessel 12 may be vented to the shroud 14 through valve 17. Gas contained within the shroud 14 may be further vented outside the bottle assembly though valve 20 to vent line 28. Pressure vessel 12 is also configured for insertion of a temperature probe 25 into the pressure vessel at its apex so as to measure the fluid temperature at that point and thus enable the assessment of the thermodynamic state of the contents of the bottle and hence determine the fill state. Mounting structure 24 provides for further mounting of the bottle assembly.

Fluid to be employed in the system may be loaded into the bottle through port 39. During system operation the gas may also exit through port 39. As is shown this port is connectable to supply line 30. Supply line 30 is further connectable to redundant sealing disconnect 31. Disconnect 31 is employable for connecting to ground support equipment (GSE) which delivers fluids into bottle assembly 10. Supply line 36 is employed for carrying gas which is exiting bottle assembly 10.

In one configuration of the invention, the heat exchanger 32 may employ hot gas supplied by the rocket engine as the source of heat. In situations where engine hot gas is not available, other self contained heat sources may be employed. Once the gas is heated by heat exchanger 32 it is then passed via supply line 34 to heat exchanger 18 located within the pressure vessel 12 of bottle assembly 10. Incorporated in supply line 34 is bypass orifice 43 which is employable for directing helium gas to tank supply line 40 or blocking it's way and directing it though supply line 41 to bottle heat exchanger 18. As will be described in greater detailed below, the heat exchanger may comprise a number of tubes extending between one or more manifolds.

Gas cooled within heat exchanger 18 may then pass out of the bottle assembly 10 via supply line 40 which in turn is connectable with on or more remotely located propellant tank(s) (not shown). As was mentioned above, the diagram in FIG. 1 specifically shows the system employed onboard a launch vehicle employing rocket motors. The flow of gas into the propellant tank(s) may be further controlled through one or more valves (not shown) associated with the propellant tank(s). As the liquid oxygen and fuel in propellant tank(s) are expelled, the helium gas flows into the propellant tank(s) to provide for pressurization. Bypass 43 may be manipulated to control the amount of gas which flows from bottle heat exchanger 18 versus directly to propellant tank (s).

Referring again to the shroud 14 and bottle portion 12 in FIG. 1, the bottle portion 12 is constructed to receive and store high pressure fluid with minimal leakage. One possible material employable for the storage of supercritical helium is annealed Extra Low Interstitials Grade TI-6Al-4V titanium alloy. This material is desirable because at operational temperatures for helium (7°–140° R) this singular grade has very low specific heat and thermal conductivity, very high strength, adequate ductility, low density and is readily forged, machined and welded, available from a multitude of sources and is relatively inexpensive.

Figure 2A:
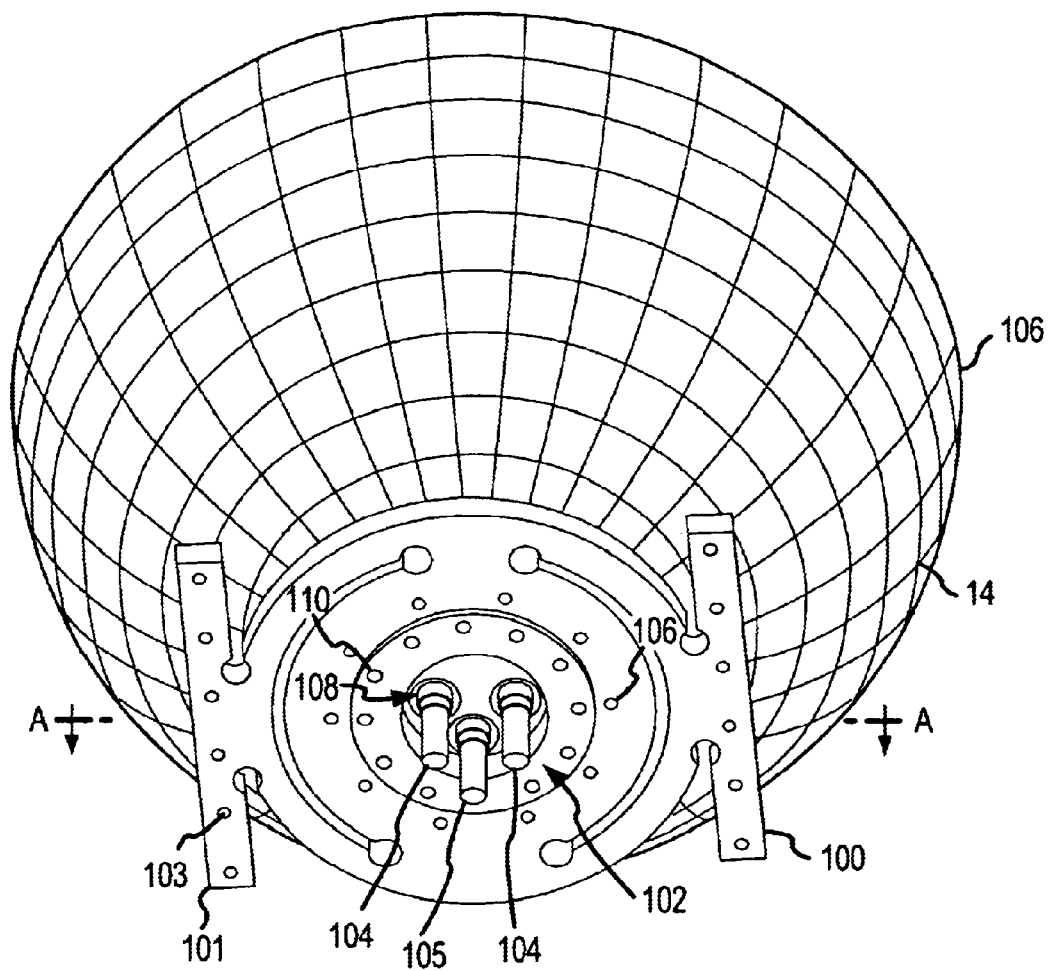
FIG. 2a a perspective view of the inner container (pressure vessel) with mounting flex plate and FIG. 2b discloses a cross sectional view of a portion of the pressure vessel and mounting flex plate.

Disposed over substantially all of the outside of the pressure vessel 12 is a shroud 14 approximately 0.050 to 0.100 thick composed of metallic or composite material which is capable of minimal leakage. This shroud is capable of containing liquid or gaseous helium or other fluids used as a coolant for the bottle assembly under low pressure, typically less than 50 psig. The gap between the shroud and the pressure vessel exterior surface is approximately 0.50 inch. Disposed substantially over all the shroud exterior surface is an insulative layer of either closed cell foam (urethane or equivalent), ceramic fiber batting (Cryolite, MinK or equivalent) or Aerogel insulation. The insulation layer may be approximately 2.0 inches thick. Coolant in the form of liquid or gaseous helium or other fluid is introduced at the bottom of the shroud and flows upwards to vent at the apex. The boiling of the liquid helium within the shroud serves to remove heat from the pressure vessel and from the external environment with minimal temperature change in the coolant since this heat energy is substantially converted into the heat of vaporization of the helium The pressure vessel and shroud are supported principally at the bottom by a thermal isolation support flex plate which interfaces the bottle assembly to the adjacent supporting structure with minimal heat flux into the bottle. It also provides the interface between the shroud and pressure vessel to complete the flow passage for coolant. Disclosed in FIGS. 2a and b are views of the flex plate interconnected with the shroud and pressure vessel. As can be seen in FIG. 2a, the flex plate 100 is connectable to the container so as to encircle the hex base fitting 102. Included as part of the flex plate 100 are various attachment means for attaching to adjacent supporting structure. These include flange 101 which includes attachment holes 103.

Integrated into the hex base fitting 102 are the hex inlet/outlet tubes 104. These tubes provide for the ingress and egress of fluid to and from the bottle heat exchanger. Inlet/outlet tube 105 provides for ingress and egress of fluid to and from the interior of the pressure vessel. These inlet/outlet tubes are locatable within the hex base fitting through use of seal pack around tubes 108. The flex plate is attachable to the hex base fitting through use of flexplate bolts 106. The hex base fitting is attachable to the container through use of hex bolts 110. The hex base fitting 102 is mountable within a polar aperture incorporated in the pressure vessel 12. The aperture is sized to enable installation and removal of the heat exchanger.

The polar aperture may be further sized to enable the welding of the pressure vessel subcomponents from the inside of the pressure vessel so as to provide for a higher quality weld with minimal defects and inspection of same and to simplify the interpretation of inspections performed on the weld since weld root drop through and spatter is eliminated leaving a smooth inner and outer weld contour. The aperture size also enables the insertion of inspection tools, radiographic film or other devices, so as to facilitate the highest quality visual, radiographic and/or dye penetrant for inspection of any welds performed in the manufacture of the pressure vessel. This permits the flaw size which must be assumed in the fracture analysis of the bottle to be reduced and thus allows the structure to reliably be used at high pressures and low temperatures.

Figure 2B:
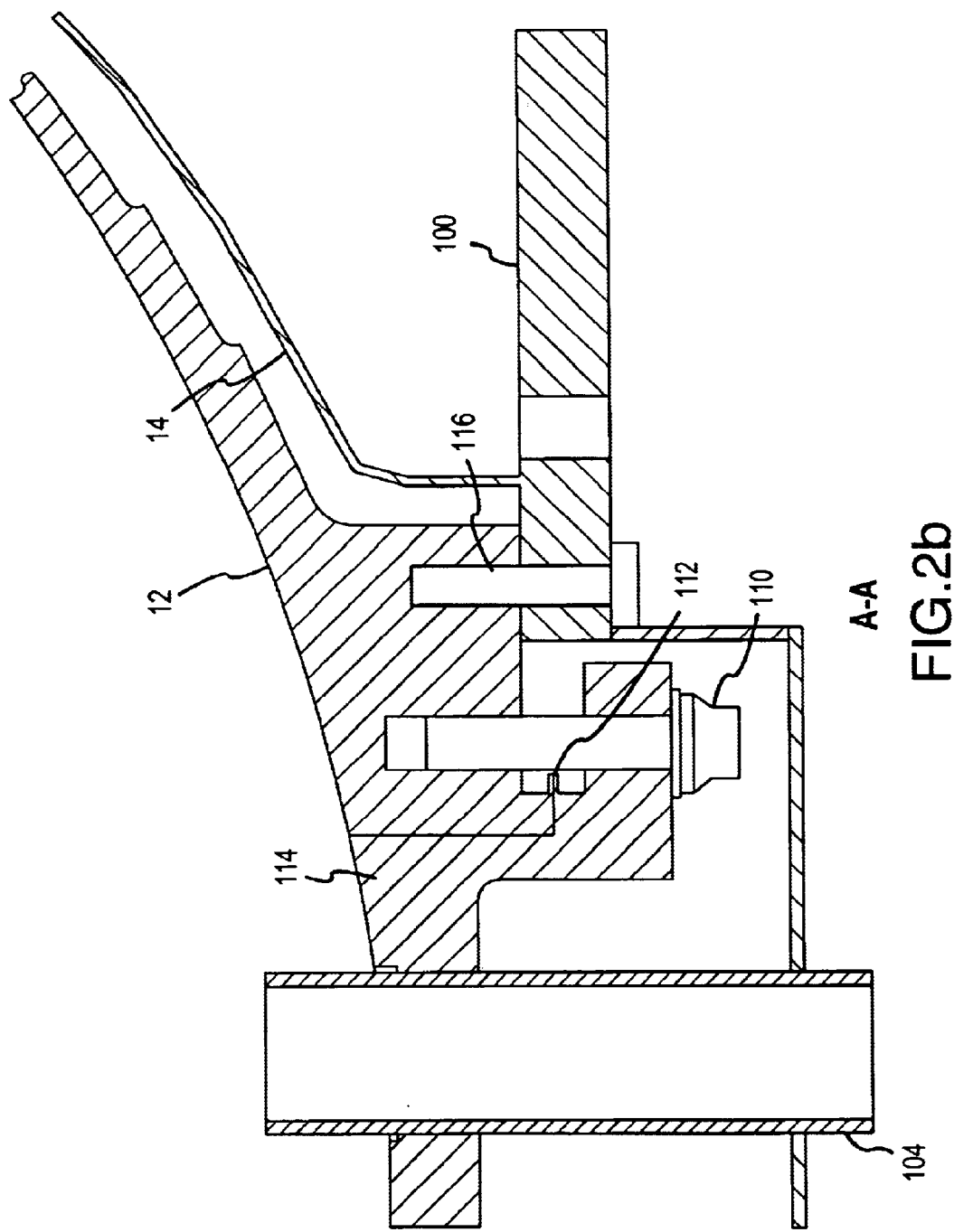

Disclosed in FIG. 2b is a cross-sectional view of the assembly described herein where the flex plate attaches to the container. In this particular view, the shroud 14 is shown enclosing the pressure vessel 12. Incorporated as part of the pressure vessel 12 is heat exchanger base/bottle enclosure 114. The enclosure portion provides for passage into the container for the heat exchange inlet/outlet tubes 104. The enclosure portion 114 is attachable to the container through use of a burn down TIG weld 112 which provides a high reliability gas barrier without the use of seals. Fasteners 110 are of the high strength type so as to provide resistance to pressure loads.

The configuration of the flex plate 100 introduces a tortuous path for heat to flow from the environment to the pressure vessel and also provides passages for coolant to substantially remove the heat that does leak in before it reaches the pressure vessel. The flex plate may be fabricated from aged Inconel 718 which has the high strength, high modulus, relatively low thermal conductivity as well as machinability and weldability to the adjoining shroud. Foam or ceramic fiber insulation also is disposed over the exterior of the flex plate and interfaces without gapping to the insulation on the shroud.

Figure 3:
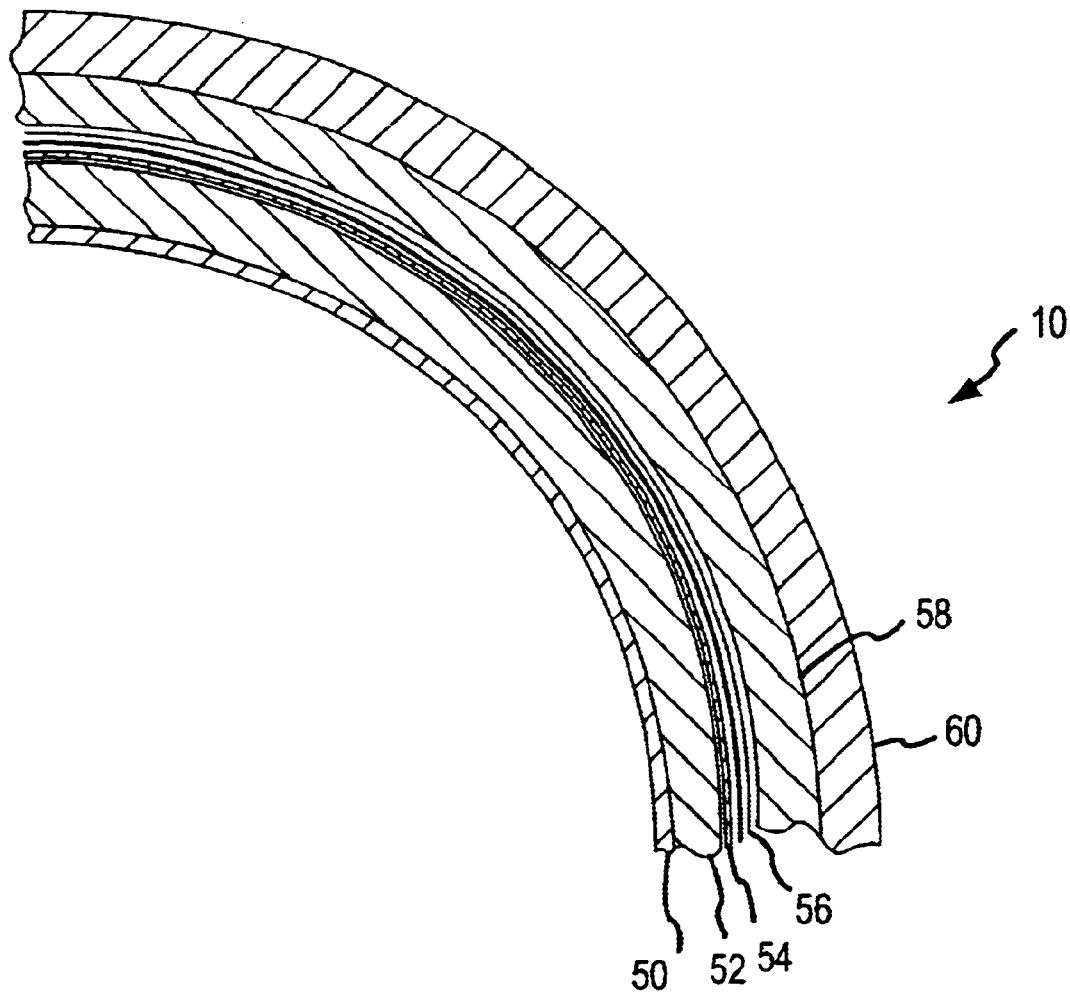
FIG. 3 discloses a cross section of an alternative configuration of the storage bottle.

A cross sectional view of an alternative configuration for the bottle assembly 10 is disclosed in FIG. 3. Shown in particular is a cross sectional view of the bottle showing the layers comprising its construction. The structural part of the bottle assembly, the pressure vessel 50, is constructed to receive and store high pressure fluid. One possible configuration for the container may include forged bottle halves of Ti-6AL-4V titanium material, extra low, interstitial grade in the annealed condition, welded together substantially using electron beam welding, wherein the welding is performed from both the inside and outside of the container.

Disposed over substantially all of the outer surface of bottle shell 50 is insulative layer 52. This layer may comprise urethane foam which is approximately one inch thick. On top of that may be disposed thin a layer of aluminum foil 54. Disposed over the aluminum foil shield 54 may be the aluminum cooling tubes 56, which makes up the Vapor Cooled Shield 14. The tubes are employable for carrying helium which provide for the cooling and insulation of the bottle shell. The aluminum cooling tubes may be in communication with the enclosed volume of the bottle shell. Over the aluminum cooling tube 56 may be disposed another layer of urethane foam 58 approximately one inch thick. On top of this last layer of foam may be cryolite insulation 60 which is also approximately one inch thick.

The bottle assembly disclosed in FIG. 1 and FIG. 2 is specially configured for storing gases at extremely low temperatures and high pressures. Other configurations of the invention are possible whereby pressurized gas is stored at ambient or near ambient temperatures. Depending on the type of gas stored, the bottle assembly may be configured accordingly.

Figure 4:
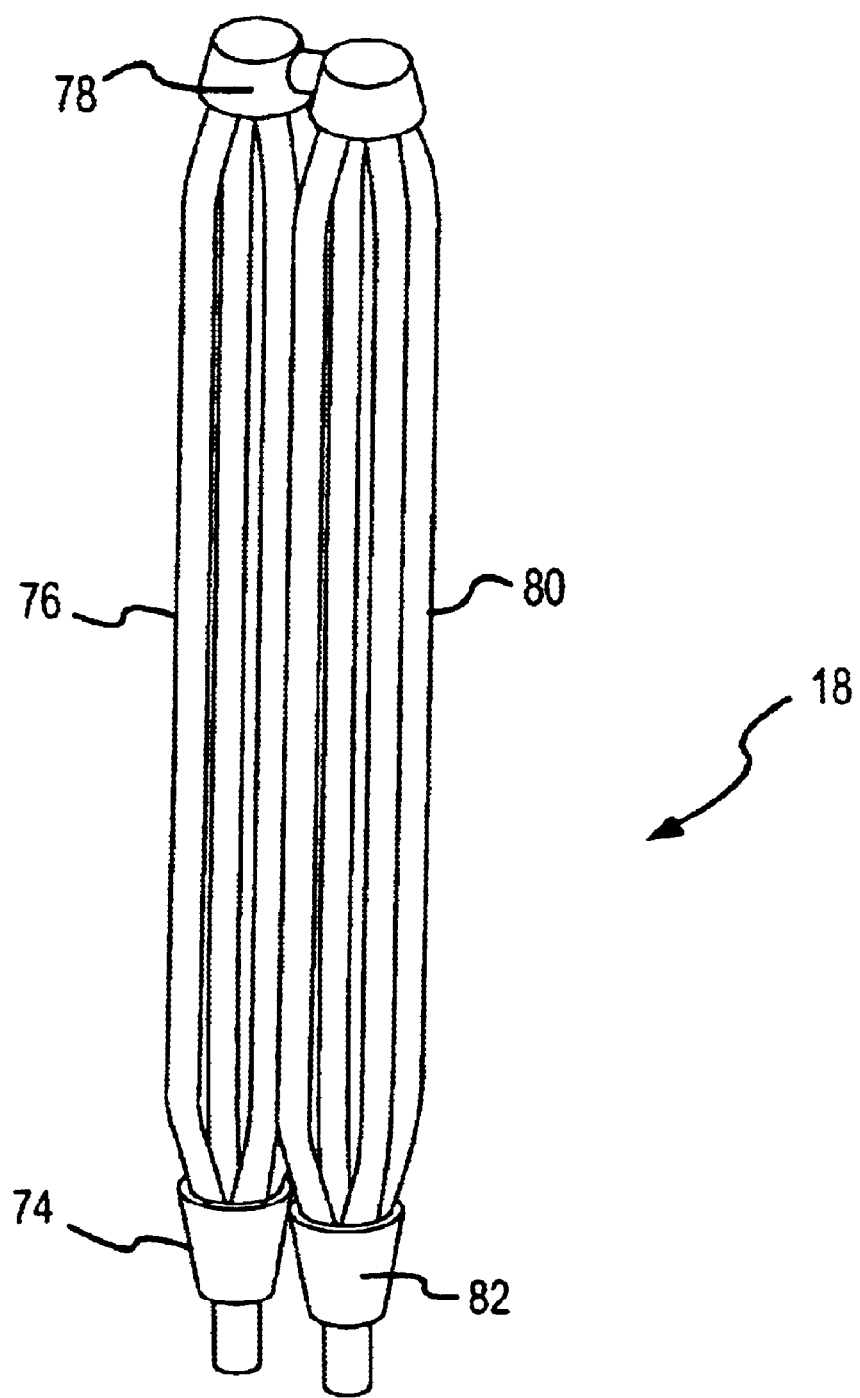
FIGS. 4 discloses one configuration of the heat exchanger locatable within the gas storage tank.

Disclosed in FIG. 4 is a perspective view of the bottle heat exchanger 18, which is locatable within the pressure vessel. As is seen in FIG. 4 the heat exchanger 18 comprises a number of tubes 76 and 80 configured for helium gas to flow through. The tubes may be a sized so as to provide for a desired amount of surface area exposure to the gas within the bottle assembly. The tubes 76 and 80 may be configured in particular shapes and be constructed of selected materials to account for the environment in the bottle. For example, in a situation where the bottle assembly is filled with supercritical helium, the material of the tubing must be able to withstand a large temperature gradient, and the shape of the tube must provide for expansion and contraction without generating high loads on adjacent structures as would otherwise occur in such an extreme environment. Further, the heat exchanger may be mounted within the bottle in a substantially vertical position so as to maximize dispersal of heat via free convection.

Included as part of the heat exchanger is inlet manifold 74. Inlet manifold 74 is in connection with supply line 34 as was shown in FIG. 1. Through this manifold, the heated helium gas from the remote heat exchanger 32 is directed into the bottle assembly. Once in the inlet manifold 74, the helium gas will flow through inlet tubes 76 wherein a portion of the heat exchange between the gas in the heat exchanger and the gas in the container will occur. Also in connection with the inlet tube 76 is turn around manifold 78, which directs the gas from the tubes 76 to outlet tubes 80. Outlet tubes 80 are connected to outlet manifold 82, which directs the gas out of the bottle assembly into supply line 40. As was described above, the gas is then directed through the system to the propellant tank(s) to provide pressurization.

Disclosed in the FIGS. 5a and b are views of an alternate configuration of the heat exchange device 18. In this configuration, serpentine aluminum tubing is employed to carry the heated gas through the bottle assembly contents so as to provide heating to the contents of the pressure vessel. Included as part of this heat exchange device, mounting plate 96 within which are incorporated inlet and outlet ports for providing for the ingress and egress of the gas. Connected to mounting structure 96 are the serpentine tubes 92. As can be seen in the perspective view of FIG. 5b, multiple layers of the serpentine tubes may be employed. Also included as part of the assembly are support brackets 94 which provide structural support for the serpentine tubes 96. As was described with regards to the configuration shown in FIG. 4, heated gas which is run through the serpentine tubes is then directed to pressurize a remotely located propellant tank.

Figure 6:
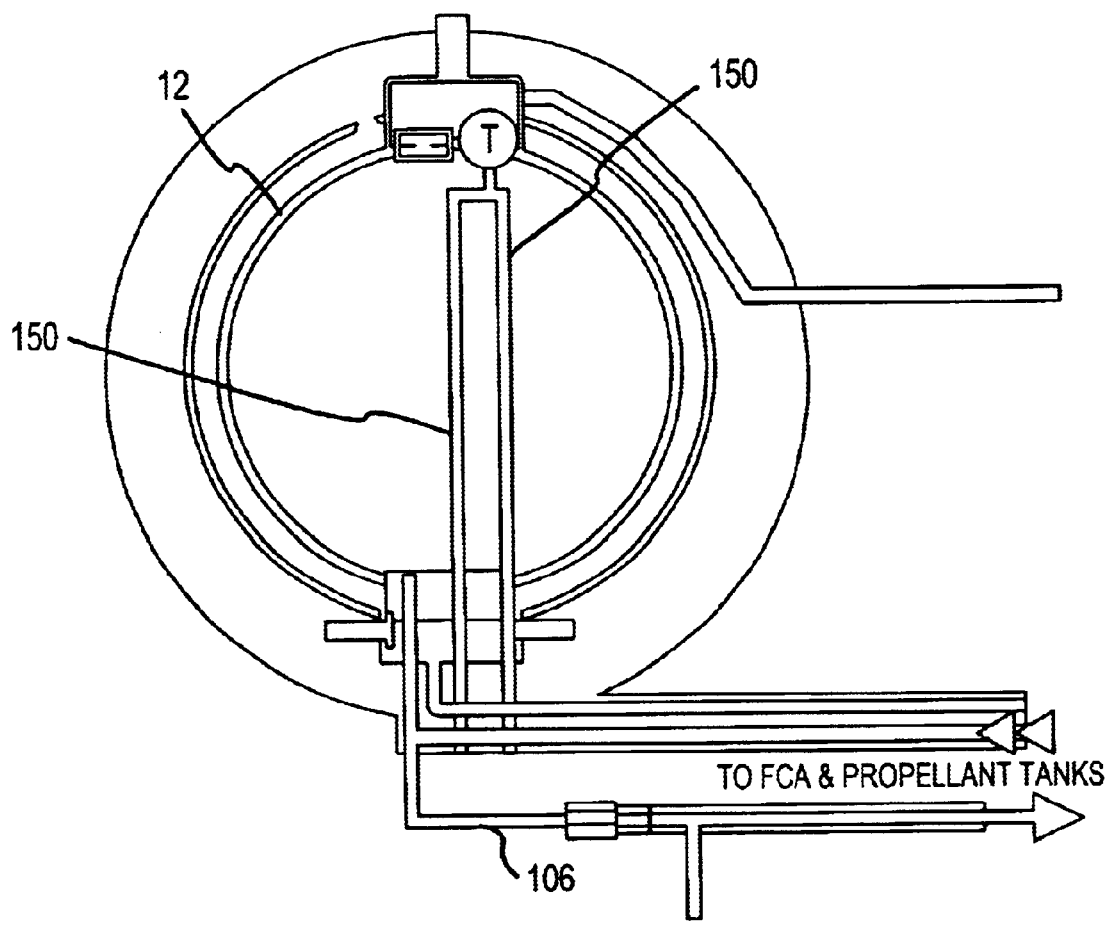
FIG. 6 discloses a configuration of the gas storage system which does not portray an external heat exchanger.

An alternative configuration for the bottle assembly is disclosed in FIG. 6. According to this configuration, the heat exchanger positioned within the container is not otherwise connected to a heat exchanger device outside the container. This configuration includes a heating element 150 which is locatable within the pressure vessel 12. In this configuration, once the heating element 150 is activated, heating of the helium will occur, which in turn affects the bottle pressure. The flow of the helium gas out of the bottle assembly is through supply line 106 which in turn flows directly to the propellant tank(s). In this case, there is no need to route the helium gas through any external heat exchangers. The heat exchanger 150 employs its own source of heat, or source of power in order to generate heat. Sources of heat may include heated gases from the engine, as well as devices, such as electrical heating coils, which generate their own heat.

For a helium gas supply system employable aboard a rocket, the system must be loaded in a specific sequence in order to minimize the consumption of coolant and total time to load the coolant. Initial chilldown of the GSE and airborne system is accomplished by low pressure flow of LHe though the GSE and into the bottle assembly. Coolant flows both through the shroud and though the pressure vessel which has a small bleed passage at the top of the pressure vessel. Coolant gas is vented at multiple points both on the GSE and through the airborne vents. When the bottle shell is sufficiently cold it fills with liquid He, or very cold gaseous helium at approximately 7R. Once this condition is established the GSE LHe pump is turned on and increases the internal pressure until the desired operating condition is arrived at. During this stage the liquid helium becomes a supercritical fluid. The loading process drives the density of the contained helium to approximately 13–15.5 p/cu-ft. According to the described configuration of the bottle assembly, this condition can be maintained indefinitely, with the GSE providing bottle make-up helium to account for that bit of helium that is vented. Low pressure LHe coolant flow through the shroud continues to remove the heat of compression from the gas within the pressure vessel and continues to intercept heat from the environment.

Once the vehicle is launched and the need for propellant tank pressurization exists, the very cold, very dense helium is withdrawn from the bottle. Once out of the bottle, the helium passes through remote heat exchanger 32 where it picks up heat directed from the rocket engine. As was mentioned above, in addition to or instead of using the engine heat, other heating devices may be positioned remotely, or in the bottle assembly, and be employed for heating the cold helium gas.

Once the helium has passed through heat exchanger 32, it is now hot (approximately 500–600 degrees Fahrenheit) and is then directed via supply line 34 into heat exchanger 18 positioned within the bottle assembly. The helium gas passes through the heat exchanger 18 where it gives up a significant amount of heat to the cold helium in the bottle. Without this added heat the withdrawal of the helium from the bottle and associated expansion cooling would rapidly collapse the bottle pressure rendering the system non-functional. The helium gas exits the heat exchanger and bottle assembly at a condition hot enough to efficiently pressurize the rocket propellant tanks, but not hot enough to damage any downstream components. As such, by passing the hot helium gas through the bottle heat exchanger after it is heated by the external heat exchanger 18, bottle fluid temperature is increased with a corresponding increase in bottle pressure. Gas stratification within the bottle actually enhances this phenomenon since the gas in intimate contact with the heat exchanger rises under convective forces to form a bubble of warm helium which rides on top of the denser helium at the bottom of the bottle. Since the helium is withdrawn from the bottom of the bottle the densest gas is extracted first resulting in a remainder of gas with a low density and hence the lowest possible residual gas mass. Upon launch the coolant within the shroud is vented and drained away from the bottle so as to stop the cooling process which is no longer desired. This prevents the heat being rejected within the bottle from simply being absorbed by the coolant in flight.

The heating of the gas within the bottle assembly may continue to a significant point above ambient temperature wherein all, or substantially all, of the bottle contents are depleted. The advantage of this system is that the ratio of useable helium to residual helium is greatly increased compared to standard bottle blow down extraction.

Figure 7:
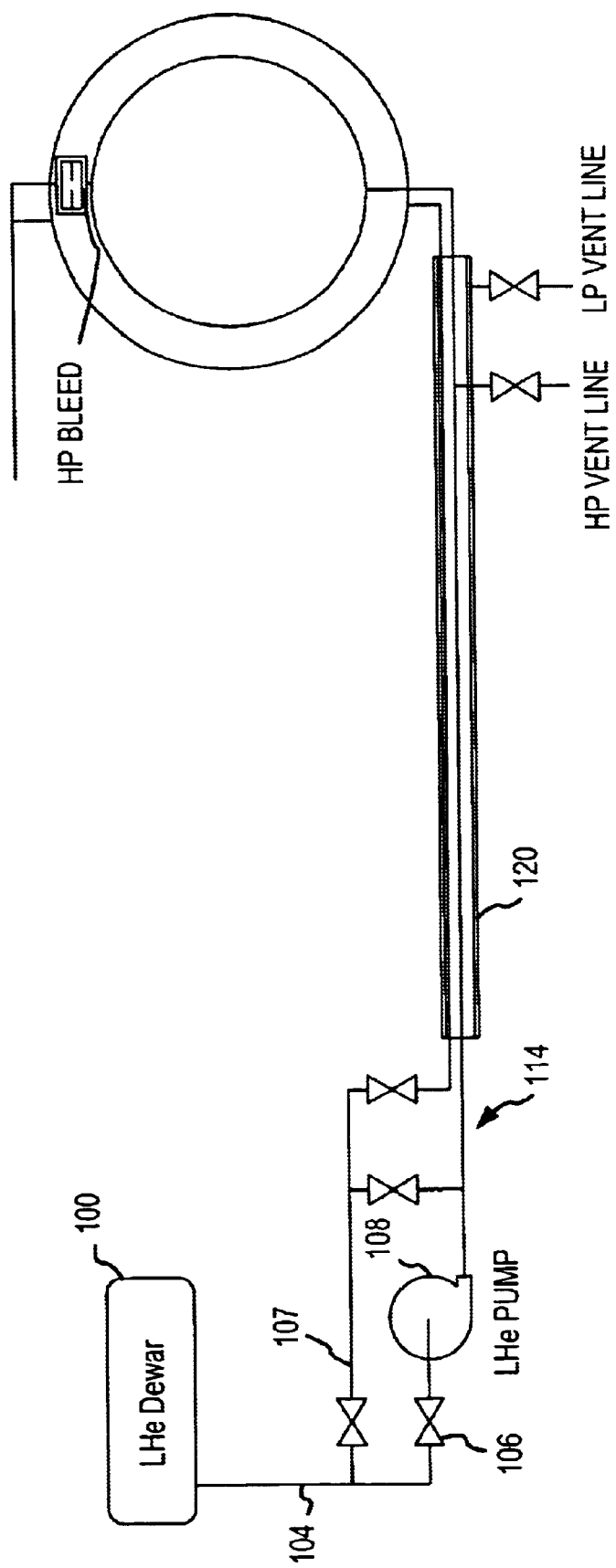
FIG. 7 discloses a system diagram for the facilities employed in the chill down and filling process for the on board gas storage bottle.

As was mentioned above, prior to the use of the gas storage system in an airborne launch vehicle, the cooled helium gas must be first loaded into the prepared bottle assembly. As was described above, this is performed by cooling the fluid and the bottle assembly prior to starting the loading process. Disclosed in FIG. 7 is a system diagram which includes the components employed in preparing and then filling the bottle assembly. Included as part of this ground support equipment (GSE) is a transport trailer 100 for delivering the liquid helium from a remote supply center. The trailer 100 is connected to the GSE through supply line 104 and valve 106 which provides a connection to liquid helium pump 108. The LHe trailer is also connected to the low pressure LHe supply line 107. The liquid helium pump 108 is connected to high pressure supply line 114. These two supply lines are joined at a coaxial supply line 120 wherein the high pressure flow passage is surrounded by the low pressure flow passage. This design enables the transfer of heat from the high pressure fluid to the low pressure coolant before it enters the bottle assembly under efficient heat transfer conditions. This is important in removing the heat of compression added by the LHE pump to the high pressure fluid which is flowing towards the bottle pressure vessel. Control of the relative flowrates of the high and low pressure He supplies enables control of the exit temperature of the coaxial line. This enables a more rapid fill of the bottle thus enabling final fill to be accomplished late in the countdown process which thus minimizes the total coolant consumed and hence minimizes costs.

In addition, the overcooling of the high pressure fluid can be avoided by throttling low pressure coolant flow. Overcooling can result in potential helium freezing within the high pressure flow passages of the system which is not desirable.

Various bayonet connections provide for establishing the noted connections. All bayonets which contain high pressure He are of coaxial vapor cooled design with the low pressure fluid surrounding the high pressure. This feature simplifies the design of the bayonet by enabling a drastically shorter engagement and allows tolerance for low level leakage from the HP side since all leakage is simply collected in the low pressure cavity. The coaxial supply line further provides a connection to the mobile launch platform (MLP) within which the vehicle is supported. Further coaxial plumbing on the MLP enables connections to be made to the vehicle and the bottle assembly.

Figure 8:
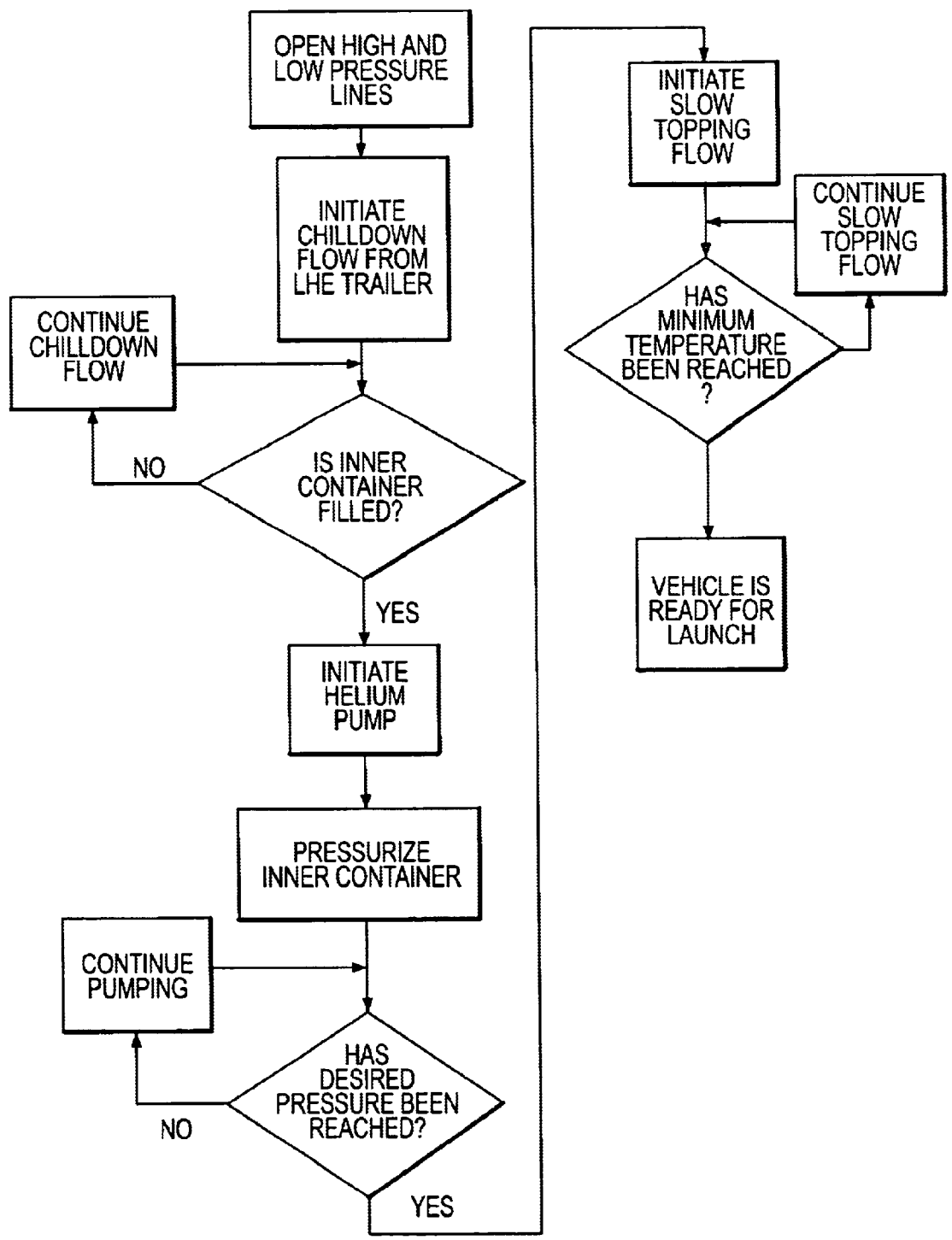
FIG. 8 discloses a flow chart which described the steps performed when chilling down and filling the gas storage bottle.

Disclosed in FIG. 8 is a flow chart which describes in detail the steps performed by the system in performing the chill down and fill process for the bottle assembly. The chill down and fill process may be monitored by any number of different computer systems. These processes may be performed by separate systems which are in communication, or one overall system. Various pressure and temperature sensors may be positioned through out the system to provide indication to an automatic control system or a system operator when desirable conditions have been achieved. To initiate the airborne system chill down flow, LHe from the LHe trailer is allowed to pass through the LHe pump and both high and low pressure supply lines and thus in to the bottle assembly. Vents may be established on the GSE to speed chilldown of various areas and achieve a steady state condition as rapidly as possible. Low pressure chilldown continues until the bottle pressure vessel is substantially filled with LHe 7–10R. The liquid helium pump is initiated and the high pressure flow passage and thus the bottle pressure vessel are gradually pressurized. The fluid exiting the LHe pump is warmed to approximately 60–70R by the work being performed on it and is subsequently cooled in the coaxial supply line to approximately 20–30R. The pressure is gradually raised until it reaches approximately 4600 PSIG. Further cooling occurs in the bottle assembly due to low pressure coolant flow through the shroud, and gas from the pressure vessel that slowly flows out of the bottle through a bleed at approximately 15 lbs/hr. Slow topping flow is maintained after this rapid fill and bottle temperature gradually decline until they are between 15 and 25 R. At this point the vehicle is ready for launch. At launch, the bottle is disconnected from the GSE.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described herein above are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An apparatus for storing a pressurized gas comprising:
   an pressure vessel element whose structure comprises a high strength material configured for containing fluid at extremely low temperatures and high pressures, wherein the pressure vessel is further configured with at least one device to provide for the ingress and egress of the fluid and stored gas;
   a temperature control layer disposed substantially over the container element configured to remove heat from the pressure vessel and prevent heat from the external environment from reaching the pressure vessel; and
   at least one heating element locatable within the container element, wherein the heating element is configured to transfer heat to the stored gas so as to affect pressure of the stored gas.

2. The apparatus of claim 1 wherein the stored gas is supercritical helium with a density above that of liquid helium.

3. The apparatus of claim 2 further configured to store the supercooled helium gas at a temperature of approximately 20° R, at approximately 4600 PSI.

4. The apparatus of claim 2 further configured to be connectable to ground equipment so as to be prepared for and to receive the supercritical helium.

5. The apparatus of claim 1 wherein the at least one heating element comprises a heat exchanger which receives a heated transfer medium so as to transfer heat to the stored gas.

6. The apparatus of claim 5 wherein the heat exchanger is disposed within the bottle in a substantially vertical position so as to maximize dispersal of heat via free convection within the bottle.

7. The apparatus of claim 5 wherein the bottle is configured so that the fluid is withdrawn from the bottom of the bottle, and so that upon stratification of the stored gas within the bottle all high density gas is removed first and this forms a relatively low density zone at the top of the bottle.

8. The apparatus of claim 5 wherein the transfer medium comprises at least one of: the stored gas which has been directed to an external heat exchanger and returned to the heat exchanger within the bottle.

9. The apparatus of claim 5 wherein the remote heat exchanger employs rocket engine generated hot gas as a heat source.

10. The apparatus of claim 5 wherein the container element comprises forged bottle halves of Ti-6-4 Extra Low Interstitials Grade in the annealed condition (titanium) welded together substantially using electron beam welding, wherein the welding is performable from both inside and outside of the container.

11. The apparatus of claim 5 in which the cooling medium within the temperature control layer is liquid helium whose boiling serves to remove heat from the pressure vessel and from the external environment.

12. The apparatus of claim 5 wherein the pressure vessel includes a polar aperture to enable installation and removal of the heat exchanger.

13. The apparatus of claim 12 in which the aperture further enables the insertion of at least one of: inspection tools, radiographic film or other devices, so as to facilitate inspection of any welds performed in the manufacture of the pressure vessel.

14. The apparatus of claim 12 in which the bottle aperture size enables the welding of the pressure vessel subcomponents from the inside the pressure vessel so as to provide for a higher quality weld with minimal defects and inspection of same.

15. The apparatus of claim 14 in which the flex plate provides an interface for the influx of coolant to the temperature control layer and also provides a gas tight seal to the shroud element of the temperature control layer.

16. The apparatus of claim 5 wherein the pressure vessel is further configured permit slow venting from the top of the container so as to selectively bleed warmest material from the container.

17. The apparatus of claim 5 further configured for insertion of a temperature probe into the pressure vessel at its apex so as to measure the fluid temperature at that point.

18. The apparatus of claim 5 in which the bottle is supported at the base by a flex support plate which provides a tailored flexibility and high thermal resistance.

19. The apparatus of claim 18 in which the flex plate is fabricated from solution treated and aged Inconel 718 alloy for high strength, high modulus and low thermal conductivity.

20. The apparatus of claim 5 wherein the bottle heat exchanger comprises:

an inlet manifold for receiving the medium from the remote heat exchanger;

at least one first tubular shaped member extending from the inlet through a substantial portion of the inner volume of the container element for receiving the medium from the inlet manifold;

a turn around manifold connectable to the at least one tubular shaped member configure to receive the medium from the at least one tubular shaped member;

at least one second tubular shaped member connectable to the turn around manifold for receiving the medium; and an exit manifold connectable to the at least one second tubular shaped member for receiving the medium for the at least one tubular shaped member and directing the medium out of the container element.

21. The apparatus of claim 1 wherein the temperature control layer is composed of a metallic shroud fabricated from spun formed and welded corrosion resistant steel forming an annular space between itself and the pressure vessel for the flow of coolant.

22. The apparatus of claim 21 wherein the shroud is further configured to receive coolant introduced at the bottom of the shroud and vented at the top.

23. The apparatus of claim 21 further including a support flex plate which is connectable to the shroud so that an aft support for the pressure vessel is substantially immersable in liquid helium to reduce heat from flow into the container.

24. The apparatus of claim 1 wherein at least one insulative layer surrounds the temperature control layer and comprises at least one of: urethane foam, cryolite insulation or an aerogel derived insulation.

25. The apparatus of claim 1 further configured to be locatable aboard a rocket powered launch vehicle wherein a connection is further established to a propellant tank which receives the pressurized gas.

26. A method of providing a source of pressurized gas aboard a rocket powered launch vehicle, comprising the steps of:

providing a storage bottle which is configured to receive and hold a stored gas at a predetermined pressurization and includes an internally mounted heating device configured to transfer heat to the stored gas;

preparing the storage bottle for receiving an amount of the stored gas;

pumping stored gas into the bottle from a remotely located source at a predetermined temperature until a desired pressure are attained;

allowing amounts of the stored gas to exit the bottle to be directed to at least one remote location; and as the stored gas exits the bottle, employing the internally mounted heating device to control temperature of the stored gas to affect pressure of the stored gas.

27. The method of claim 26 wherein the stored gas is supercritical helium at a density of at least 7 lbs/ft$^3$.

28. The method of claim 27 wherein the pressurized gas is pumped at a temperature of 7 to 60 degrees R, and the desired pressure is 50 to 4600 psi.

29. Method of claim 28 wherein low pressure liquid helium from a LHe supply and High pressure helium exiting the LHe pump are flowed through a coaxial supply line wherein the high pressure fluid is surrounded by low pressure fluid.

30. Method of claim 29 wherein the coaxial supply line acts as a concurrent flow heat exchanger to move heat from the warmer high pressure fluid to the low pressure fluid.

31. The method of claim 29 wherein the flowrates of the high and low pressure LHE streams may be controlled to establish desired exit temperature conditions at the line exit and hence at the bottle assembly.

32. The method of claim 28 wherein the bottle is first substantially filled with low pressure liquid helium prior to increasing the pressure above 50 psig so as to minimize the heat of compression that would otherwise be released into the bottle.

33. The method of claim 28 wherein liquid helium coolant flow through the temperature control layer shroud can be controlled to remove heat from the pressure vessel as pressure is being increased within the pressure vessel so as to maintain the desired density within the bottle.

34. The method of claim 33 further including the step of dumping and venting from the temperature control layer at launch to remove that heat absorbing coolant material and enable efficient use of the heat flowing from the bottle heat exchanger.

35. The method of claim 26 wherein the heating device within the bottle comprises a heat exchanger through which a medium heated at a remote heat exchanger may flow so at to provide for heat transfer to the stored gas.

36. The method of claim 35 further comprising the step of directing the stored gas to the remote heat exchanger for heating wherein the heated stored gas is employable as the medium for providing heat transfer to the stored gas in the bottle.

37. The method of claim 36 wherein further comprising the step of heating the medium with hot gas provided by a rocket engine.

38. The method of claim 26 further comprising the step of mounting the bottle aboard a rocket powered launch vehicle and providing a connection from the bottle to ground support equipment.

39. The method of claim 38 wherein the step of preparing the bottle for loading and flight comprises:

flowing liquid or gaseous helium through the ground support equipment until a predetermined minimum temperature is achieved;

flowing liquid or gaseous helium into the bottle to lower the temperature to a determined amount; and flowing a further amount of fluid through a temperature control layer to provide cooling for the pressure vessel and to intercept heat from the environment from reaching the pressure vessel, wherein gas heated in the temperature control layer is exhausted through open vents.

40. The method of claim 39 wherein the remote location comprises a liquid oxygen or kerosene tank configured to provide propellant for a rocket motor.

* * * * *